US007087856B2

(12) United States Patent
Eldridge

(10) Patent No.: US 7,087,856 B2
(45) Date of Patent: Aug. 8, 2006

(54) SYSTEM AND METHOD FOR DETERMINING AN OPERATIONAL CONDITION OF A TORCH

(75) Inventor: Richard Allen Eldridge, Florence, SC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 10/980,758

(22) Filed: Nov. 3, 2004

(65) Prior Publication Data

US 2006/0091118 A1 May 4, 2006

(51) Int. Cl.
*B23K 9/00* (2006.01)

(52) U.S. Cl. .............................. 219/121.54; 219/121.57

(58) Field of Classification Search ........... 219/121.54, 219/121.57, 121.39, 75, 121.56, 121.44; 313/231.31, 231.41; 315/111.21
See application file for complete search history.

(56) References Cited

U.S. PATENT DOCUMENTS

| | | | |
|---|---|---|---|
| 4,929,811 A * | 5/1990 | Blankenship | 219/121.54 |
| 5,017,752 A | 5/1991 | Severance, Jr. et al. | |
| 5,023,425 A | 6/1991 | Severance, Jr. | |
| 5,036,176 A * | 7/1991 | Yamaguchi et al. | 219/121.44 |
| 5,183,990 A * | 2/1993 | Enyedy | 219/121.54 |
| 5,235,162 A * | 8/1993 | Nourbakhsh | 219/121.54 |
| 5,317,126 A | 5/1994 | Couch, Jr. et al. | |
| 5,491,321 A | 2/1996 | Stuart et al. | |
| 5,550,344 A | 8/1996 | Winterfeldt | |
| 5,961,855 A | 10/1999 | Hewett et al. | |
| 6,121,570 A | 9/2000 | Oakley et al. | |
| 6,206,878 B1 | 3/2001 | Bishop et al. | |
| 6,215,090 B1 | 4/2001 | Severance, Jr. et al. | |
| 6,232,575 B1 | 5/2001 | Oakley et al. | |
| 6,248,972 B1 | 6/2001 | Yamaguchi | |
| 6,670,572 B1 | 12/2003 | Norris et al. | |
| 2004/0094520 A1 | 5/2004 | Nemchinsky | |

\* cited by examiner

*Primary Examiner*—Quang Van
(74) *Attorney, Agent, or Firm*—Alston & Bird, LLP

(57) ABSTRACT

A system and associated method for determining an operational condition of a gas torch are provided. The system includes a diode device that is electrically connected between the workpiece and the nozzle. A sensing circuit is configured to provide an electric potential across the diode device and sense a resulting voltage characteristic of the condition of continuity of the system. For example, the sensing circuit can determine whether the nozzle is otherwise electrically connected to the workpiece and/or whether the nozzle is electrically connected to the electrode. The sensing circuit can determine the condition of continuity throughout the operation of the system, e.g., to verify the proper assembly of the torch, to verify proper movement of the electrode or nozzle, to verify that the torch is separated from the workpiece at start-up, and the like.

39 Claims, 3 Drawing Sheets

SYSTEM AND METHOD FOR DETERMINING AN OPERATIONAL CONDITION OF A TORCH

BACKGROUND OF THE INVENTION

1) Field of the Invention

Figure 1:
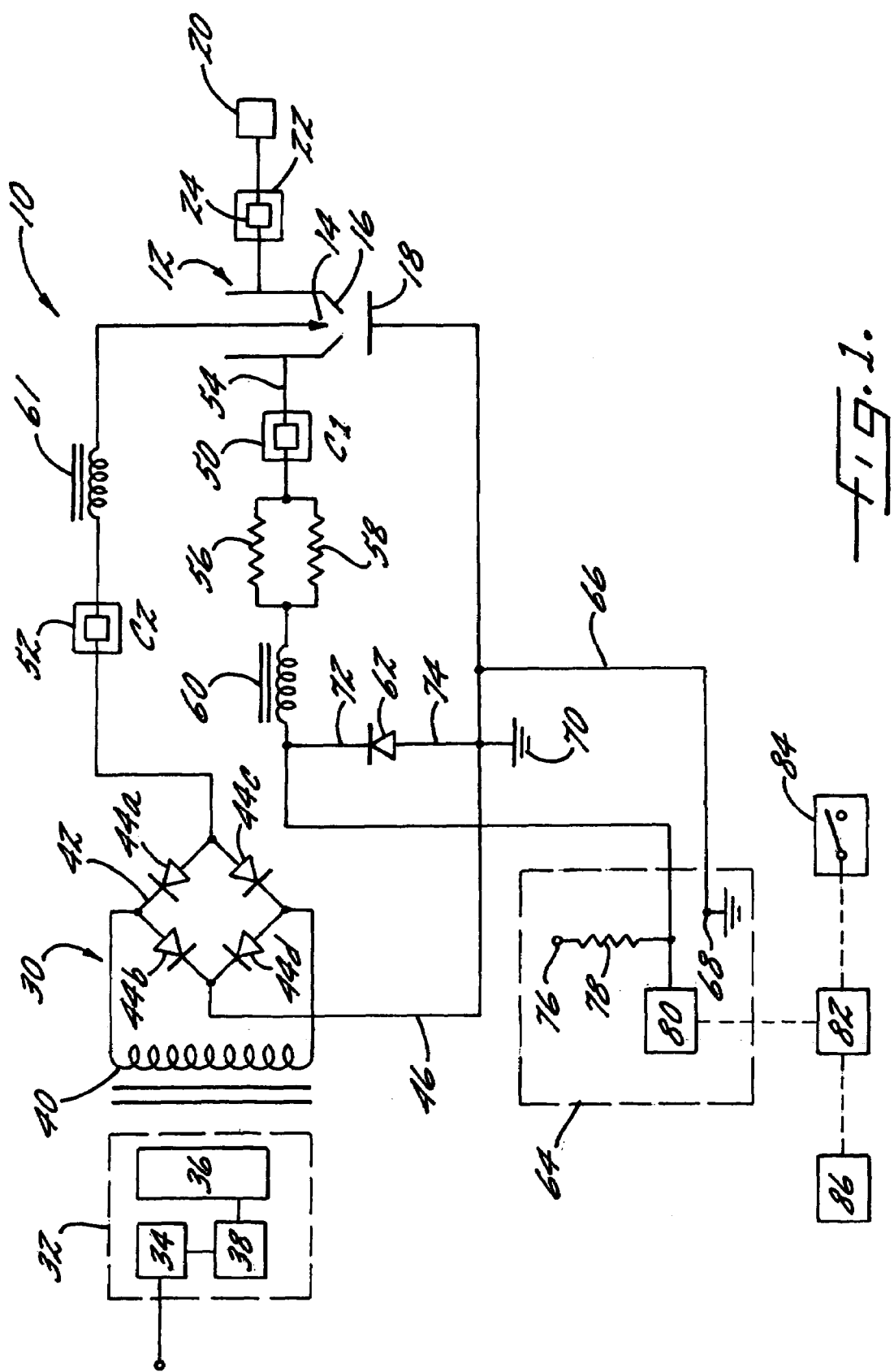

The invention relates to the operation of a torch such as a plasma arc cutting torch and, more particularly, to a system and method for determining a continuity condition between the members of the torch and controlling the operation of the torch accordingly.

2) Description of Related Art

Plasma arc devices are commonly used for cutting and welding. One conventional plasma arc torch includes an electrode positioned within a nozzle. A pressurized gas is supplied to the torch and flows through the nozzle and proximate to the electrode, and an arc is established between the electrode and a workpiece. For example, according to one typical method for starting the torch, a pilot mode is first initiated by establishing an arc at a low current between the electrode and the nozzle. A metering system also delivers a flow of gas through the nozzle during the pilot mode. The torch is then switched from the pilot mode to a transfer or working mode by transferring the arc to the workpiece so that the arc extends between the electrode and the workpiece. The current of the arc is increased for the working mode, and the flow rate or type of the gas can also be adjusted. The arc ionizes the gas, and the resulting high temperature gas can be used for cutting or other welding operations. One such torch and a start-up operation are further described in U.S. Pat. No. 5,017,752, titled "Plasma arc torch starting process having separated generated flows of non-oxidizing and oxidizing gas," issued May 21, 1991, which is assigned to the assignee of the present invention and the entirety of which is incorporated herein by reference.

In a conventional "blow-back" plasma arc torch, the nozzle is substantially fixed in position, and the electrode is configured to translate or adjust in a direction along the axis of the torch. The electrode is biased to a forward position by a spring or otherwise so that the electrode makes contact with the nozzle in a normal resting position. When the metering system provides a flow of gas to the torch, the flow of the gas adjusts the electrode in a direction away from the workpiece, thereby overcoming the spring and separating the electrode from the nozzle so that a pilot arc is established therebetween. In a "blow-forward" torch, the nozzle can instead be configured to adjust relative to the electrode so that the nozzle is adjusted in a forward direction by the flow of gas through the nozzle. In each case, a pilot arc can be established between the separated nozzle and electrode, and the arc can subsequently be transferred from the nozzle to the workpiece for a cutting or other welding operation.

In some cases, it is desirable to check or verify the continuity condition between the various components of the system. For example, generally in a blow-back or blow-forward torch, the nozzle and electrode should make contact when gas is not flowing through the nozzle, and the nozzle and electrode should not make contact when gas is flowing through the nozzle. A lack of continuity when no gas is flowing can indicate a missing, stuck, or otherwise faulty component. Similarly, continuity between the nozzle and electrode when the gas is flowing can indicate a stuck component or other improper electrical short. Such faults can prevent proper operation of the torch, e.g., by preventing a pilot arc from being established between the nozzle and electrode. In some cases, starting the torch when the components are in an improper configuration can damage the torch. For example, the electrode can be damaged if the torch is started while the workpiece is in electrical contact with the nozzle or electrode.

In some conventional torches, a continuity circuit is configured to determine if the electrode and the nozzle are in electrical contact so that starting of the torch can be prevented if the components are not separated. For example, the continuity circuit can connect the electrode to an output of a main power source that provides the current for the arcs during operation, and the circuit can detect a flow of the current from the electrode to the nozzle. However, this conventional continuity circuit does not separately indicate whether the nozzle is in electrical contact with the workpiece. Further, in some cases, the continuity circuit can be exposed to the high voltages and/or currents provided by the main power source for establishing the pilot and main arcs, thereby possibly damaging the continuity circuit.

Thus, there exists a need for an improved system and method for checking an operational condition of a gas torch and, in particular, determining the electrical continuity of the nozzle with the electrode or the workpiece. The system should be capable of checking the continuity of the torch without exposing the sensing circuit to an arc current of the main power source. Additionally, the system should be capable of controlling the operation of the torch according to the operational state of the torch.

BRIEF SUMMARY OF THE INVENTION

The present invention provides a system and method for determining an operational condition of a gas torch. The system includes a diode device that electrically connects a nozzle of the torch to a workpiece. A sensing circuit is configured to provide an electric potential across the diode device between the nozzle and workpiece and sense a resulting voltage that is characteristic of a condition of continuity of the system, e.g., indicative of continuity between the nozzle and either or both of the electrode and workpiece. Thus, the sensing circuit can determine if the nozzle is contact with the electrode or the workpiece and thereby determine, e.g., whether the electrode of a blow-back type torch is installed and operating correctly, whether the nozzle is resting against the workpiece, and the like.

According to one embodiment of the present invention, the anode of the diode device is electrically connected to the workpiece so that the diode device is configured to prevent a flow of current therethrough between the nozzle and the workpiece when the nozzle is characterized by a higher electric charge than the workpiece. Further, the diode device can be configured to prevent a pilot arc current and operating arc current of the torch from the main power source from flowing through the sensing circuit. One or more current sensors can also be configured to measure the electric current through the nozzle of the torch.

Electrically resistive devices can be disposed between the diode device and the nozzle and between the sensing circuit and the diode device. Each resistive device can have a different resistance so that the voltage at the diode device is indicative of the continuity of the nozzle with the other elements. Further, a rectified bridge, through which a current can be provided for an arc in the torch, can electrically connect the workpiece and the electrode. The electrical resistance of the bridge can be different than the resistive devices of the system so that a relatively significant voltage drop occurs in the bridge when the sensing circuit is used to detect the continuity with the nozzle and electrode connected.

According to one method of the present invention, an electric potential is provided between the nozzle of the torch and the workpiece, and the voltage across a diode that electrically connects the nozzle and workpiece is sensed to determine a condition of electrical continuity. For example, a lack of continuity between the nozzle and either the workpiece or electrode can be detected according to the voltage that is sensed between the nozzle and workpiece. In some cases, the continuity condition is checked before, during, or after a gas flows through the nozzle to verify the assembly and operation of the torch. For example, in a blow-back or blow-forward type torch, the voltage can be sensed while the gas is flowing to verify that a lack of continuity exists between the electrode and nozzle before shutting off the gas and then enabling a trigger switch of the torch and attempting to establish an arc. Similarly, the voltage can be sensed after the flow of gas is terminated to verify that the electrode and nozzle make contact in a resting position. Further, even after the trigger switch is enabled, the system can continue to monitor the voltage and verify the correct configuration of the nozzle and electrode as well as an electrical separation between the nozzle and the workpiece. If an improper continuity is detected, operation of the torch can be interrupted. In some cases, the voltage can be compared to multiple values defining one or more predetermined voltage ranges indicative of different conditions of the system.

BRIEF DESCRIPTION OF THE SEVERAL VIEWS OF THE DRAWING(S)

Figure 2:
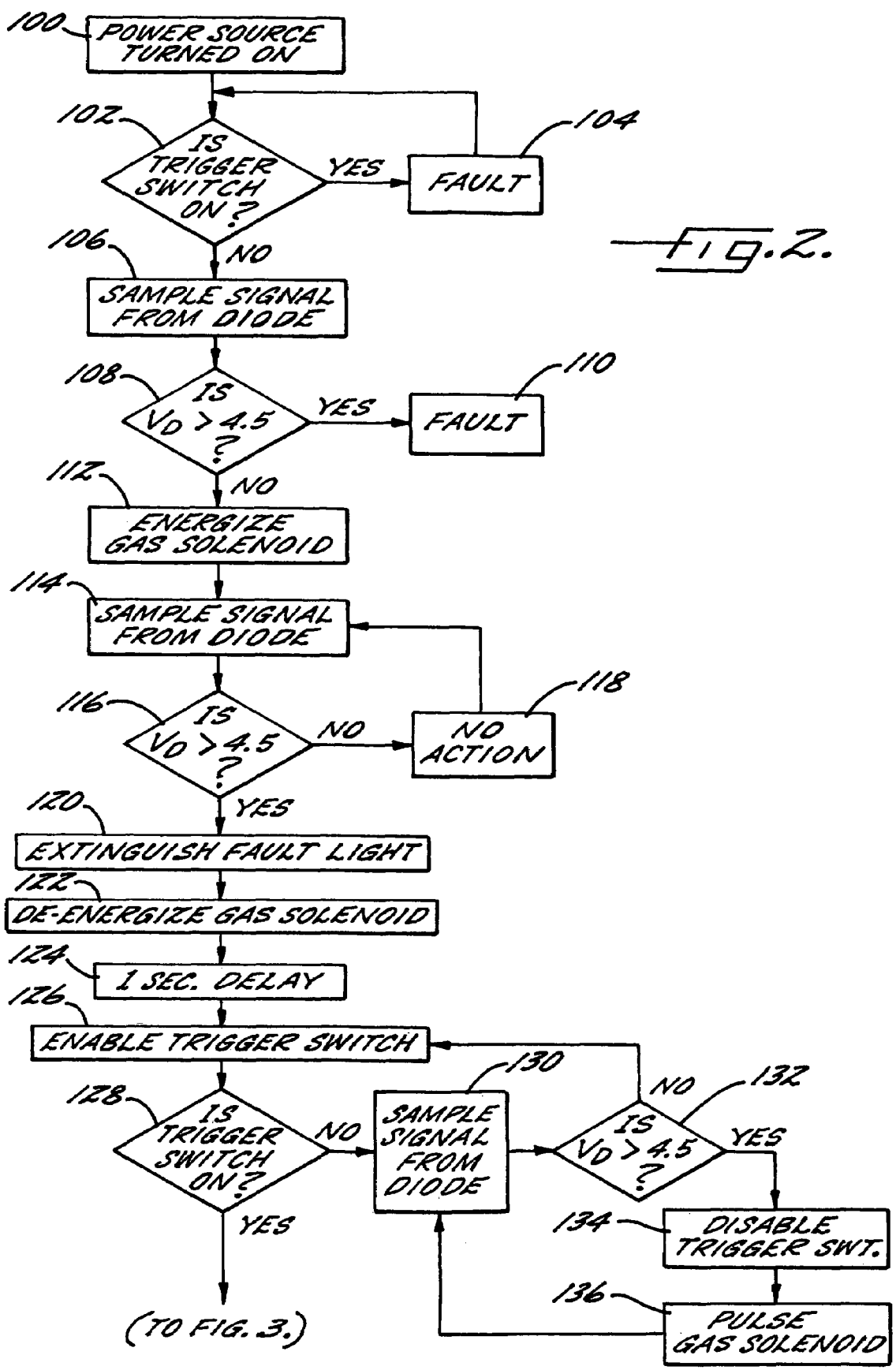
Figure 3:
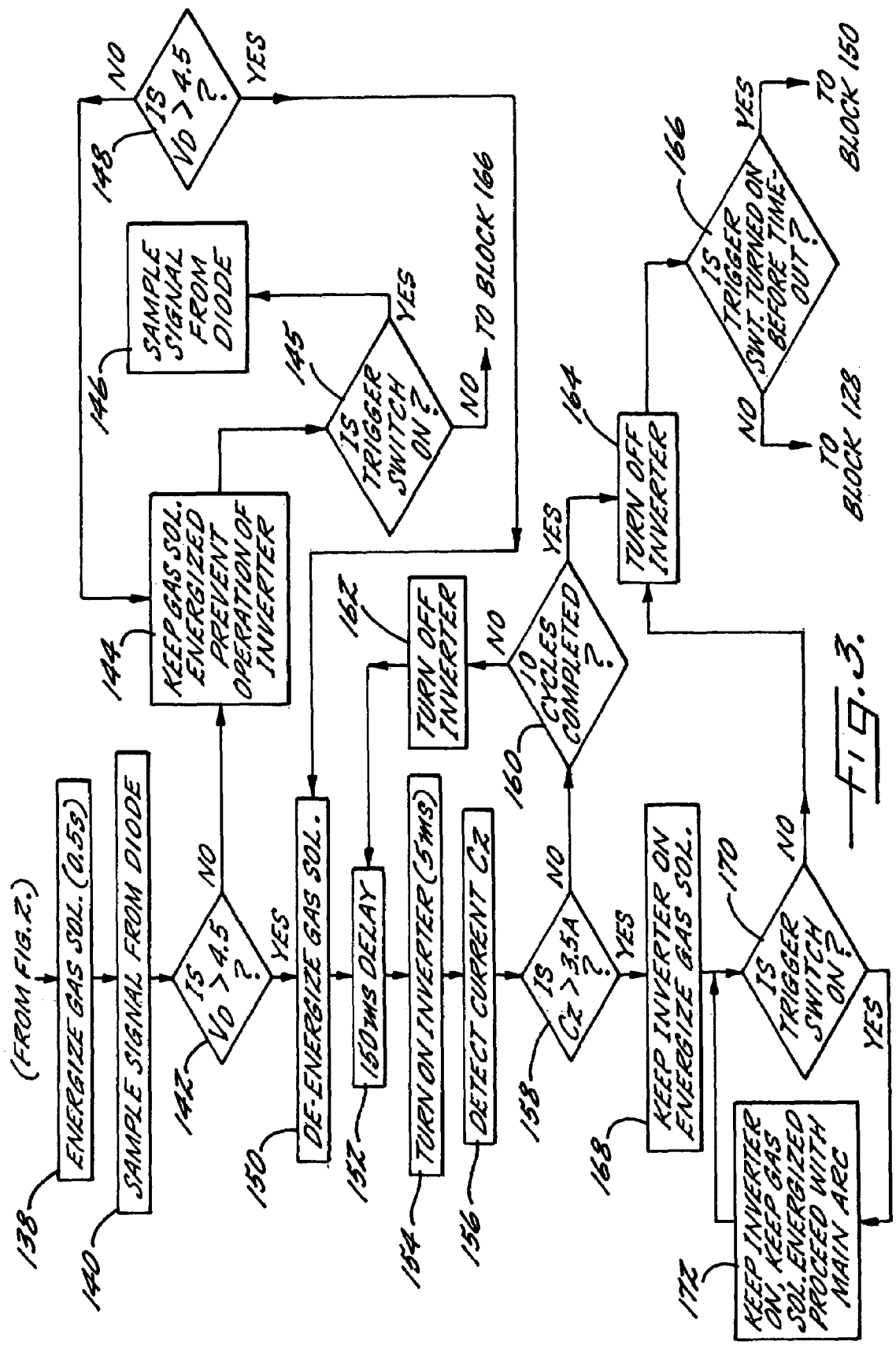

Having thus described the invention in general terms, reference will now be made to the accompanying drawings, which are not necessarily drawn to scale, and wherein:

FIG. 1 is a schematic diagram illustrating a system for operating a plasma arc torch according to one embodiment of the present invention; and FIGS. 2 and 3 provide a flow chart schematically illustrating the operations of the system of FIG. 1 according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the drawings, and in particular to FIG. 1, there is schematically illustrated a system 10 for powering and controlling a plasma arc torch 12 according to one embodiment of the present invention. That is, the system 10 can include a power source 30 for selectively providing a pilot arc current and a main arc current to the torch 12. The torch 12 is typically a plasma arc cutting torch, which can be used for cutting or other welding operations. Generally, the torch 12 includes an electrode 14 positioned in a nozzle 16. An arc can be established between the electrode 14 and a workpiece 18 during a transfer or work mode. A flow of gas is provided through the nozzle 16 to be ionized by the arc during the cutting process. The flow of gas can be provided to the torch 12 from one or more gas sources 20, via a metering system 22, which can include one or more valves, flow meters, pressure regulators, and the like for controlling the gas flow. Typically, the metering system 22 includes at least one gas solenoid 24, i.e., an electromechanical device for selectively turning the flow of gas on or off or otherwise adjusting the flow to the nozzle 16. The metering system 22 can also provide a shield gas, i.e., typically an inert gas circulated in the torch 12 in a flow path adjacent to the electrode 14 and generally radially outside the flow of plasma gas.

The structure and operation of one plasma arc torch is further described in U.S. Patent Application Publication No. 2004/0094520, titled "Plasma Arc Torch and Method of Operation," published May 20, 2004, which is assigned to the assignee of the present invention, and the entirety of which is incorporated herein by reference. An electrode for a plasma arc torch is described in U.S. Pat. No. 5,023,425, titled "Electrode for Plasma Arc Torch and Method of Fabricating Same," issued Jun. 11, 1991, the entirety of which is herein incorporated by reference. A metering system for providing gas to a plasma arc torch is described in copending U.S. application Ser. No. 09/980,374, titled "METERING SYSTEM AND METHOD FOR SUPPLYING GAS TO A TORCH," filed concurrently herewith, which is assigned to the assignee of the present application, and the entirety of which is incorporated herein by reference. It is appreciated that the system and method of the present invention can be used with other types of torches in a variety of welding operations.

In particular, the electrode 14 and nozzle 16 of the torch 12 can be configured for relative movement therebetween, e.g., as typically occurs in a blow-back or blow-forward plasma torch. That is, at least one of the electrode 14 or the nozzle 16 can be movable along the longitudinal axis of the torch 12 so that the electrode 14 and nozzle 16 can be selectively placed in contact or separated. For example, a spring (not shown) can bias the components 14, 16 together, and the components 14, 16 can be configured to separate when a flow of gas is delivered through the nozzle 16. Thus, a pilot arc can be established in the torch 12 by delivering a current through the electrode 14 and nozzle 16 while in contact, then delivering the gas through the nozzle 16 so that the components 14, 16 separate with the arc extending therebetween. Subsequently, the arc can be transferred to form a main arc between the electrode 14 and the workpiece 18, and the main arc is typically characterized by a higher arc current than the pilot arc.

Various types of power supplies and power sources can be used for providing the plasma arc current and main arc current to the torch 12. For example, the power source 30 is connected to an inverter-based power supply 32 with pulse width modulated (PWM) output current control. That is, the power supply 32 can include a rectifier circuit 34 that receives an AC voltage and provides a smooth-rectified DC voltage, a transistor-based inverter circuit 36 that converts the smoothed DC voltage into a high frequency AC voltage, and a PWM control circuit 38 that controls the inverter circuit 36. The controlled output from the inverter circuit 36 can be rectified by the power source 30, which includes a transformer 40 and a rectifier bridge 42 including diodes 44a–44d. Thus, the power source 30 can provide a variable electric current to the torch 12. In some cases, the pilot arc current delivered to the torch 12 during the pilot mode is between about 7.5 and 15 amps, while the main arc current during operation of the torch 12 in the main or transferred mode is between about 20 and 50 amps. Control of an arc in a plasma arc torch is further described in U.S. patent application Ser. No. 10/879,677, titled "SYSTEMS AND METHODS FOR CONTROLLING PILOT ARC CURRENT IN AN ARC CUTTING OR WELDING MACHINE" filed Jun. 29, 2004, the entirety of which is herein incorporated by reference. The power source 30 is typically configured with a positive output terminal 46 connected to the workpiece 18 and a negative output terminal 48 connected to the electrode 14. Current sensors 50, 52, such as hall effect type current sensors, can be provided to measure the output current. For example, as shown in FIG. 1, the first current sensor 50 is configured to measure a first current $C_1$ through a line 54, i.e., from the nozzle 16 through resistors 56, 58, an inductor 60, and a diode 62. That is, the first current sensor 50 is configured to measure the pilot arc current representative of the pilot arc between the electrode 14 and the nozzle 16 during the pilot mode of operation. The second current sensor 52 is configured to measure a second current $C_2$, i.e., the pilot and main arc currents delivered from the power source 30 to the electrode 14.

Additional electrical devices can also be provided in the system 10. For example, as illustrated in FIG. 1, inductors 60, 61 can be provided for smoothing of the arc and for energy storage. That is, with the output of the power source 30 being "pulse width modulated," the output current would be discontinuous if there were no inductance to store the energy and supply it back during the times that the output of power source 30 is zero. In particular, inductor 61 can have a large conductor size and only sufficient inductance to support the arc while cutting, (typically greater than about 20 amps). At lower pilot arc currents, significantly more inductance is usually necessary. In this regard, inductor 60 only conducts the pilot arc current (which can have a maximum current of about 15 amps in some embodiments) so that inductor 60 can have many turns of a relatively small wire. Pilot arc current flows through both inductors 60, 61 so the available stored energy is the sum of that stored in each of both inductors 60, 61. The dynamic impedance of the pilot arc and cutting arc often requires instantaneous voltages significantly higher than the "open circuit" voltage of the power source 30, and the collapsing flux fields in the inductors 60, 61 supply that high instantaneous voltage.

A sensing circuit 64 is electrically connected to the nozzle 16 via line 54. A ground line 66 grounds a ground terminal 68 of the sensing circuit 64 with the workpiece 18. The diode 62 provides a current path between the line 54 and ground 70 and, hence, electrically connects the workpiece 18 to the nozzle 16. As illustrated, the diode 62 can be configured to connect the nozzle 16 and the workpiece 18 throughout the entire operation of the torch 12, i.e., including operations of the torch 12 in which a pilot arc or main arc is established. That is, a switch need not be provided for disconnecting the diode 62 during certain operations of the torch 12, though such a switch may be provided in some embodiments of the present invention. The diode 62 can be a conventional electrical component or other similar device for restricting the direction of current between the workpiece 18 and the nozzle 16. As shown in FIG. 1, the cathode 72 of the diode 62 is connected to the line 54, and the anode 74 is grounded. In addition, a low voltage terminal 76 of the sensing circuit 64 is connected to the line 54 via a resistor 78. Thus, by detecting a voltage $V_1$ at the cathode 72 of the diode 62 via the line 54, the sensing circuit 64 can perform a continuity operation as described below, i.e., to determine whether any of the nozzle 16, the electrode 14, and/or the workpiece 18 are in electrical contact with one another other than the connection provided by the diode 62, which limits the direction of current. That is, the sensing circuit 64 can detect electrical continuity, or a lack thereof, between the members 14, 16, 18. In this regard, the sensing circuit 64 can include a detection device 80, such as a microprocessor, that is configured to detect the voltage $V_1$ at the line 54. The detection device 80 is typically configured to communicate with a controller 82 for the torch 12, which can be an integral part of the sensing circuit 64 or a separate device located remotely therefrom. In this way, the detection device 80 can communicate the status of the torch 12 to the controller 82, and the controller 82 can then control the operation of the power source 30, the flow of gas through the metering system 22, and/or other aspects of the torch 12. The controller 82 is also typically connected to other components of the system 10, e.g., to control the operation of the power source 30 and/or power supply 32, to control the gas source 20 and/or metering system 22, to receive signals from the current sensors 50, 52, and the like. Further, the controller 82 is typically configured to communicate with an operator of the torch 12. For example, the controller 82 can be configured to receive an input from the operator, such as the opening or closing of a trigger switch 84, which the operator closes when operation of the torch 12 is desired. An output device 86 can include lights, audible alarms, and the like for providing indications of the condition of the system 10 to the operator.

If no continuity exists between the electrode 14 and the nozzle 16, or between the nozzle 16 and the workpiece 18, the voltage $V_1$ at the cathode 72 of the diode 62 will be about equal to the voltage provided by the low voltage terminal 76 of the sensing circuit 64. However, if continuity does exist between the electrode 14 and nozzle 16, current will flow from the terminal 76 through the line 54 to the nozzle 16, the electrode 14, through the diodes 44a–44d of the rectifier bridge 42, and to the ground terminal 70. Thus, the voltage $V_1$ at the cathode 72 of the diode 62 will be equal to the forward voltage drop across the bridge 42 plus a voltage drop across the resistors 56, 58. The resistors 56, 58 typically provide a relatively low resistance so that the voltage drop thereacross is lesser than the voltage drop across the bridge 42. If continuity exists between the nozzle 16 and the workpiece 18, the voltage $V_1$ at the cathode 72 of the diode 62 will be equal to the voltage drop across the resistors 56, 58, which is typically about zero if the resistors 56, 58 have a low resistance relative to the resistor 78 between the terminal 76 and the line 54. Finally, if continuity exists between nozzle 16, the workpiece 18, and the electrode 14, the voltage $V_1$ at the cathode 72 of the diode 62 will be less than that of any of the foregoing conditions.

In the embodiment of the present invention illustrated in FIG. 1, the terminal 76 is configured to provide a 5 VDC signal to the line 54, each resistor 56, 58 has a value of 8 ohms, and the resistor 78 in the sensing circuit 64 has a value of 1000 ohms. Thus, the voltage $V_1$ measured by the detection device 80 will be determined according to the condition of continuity of the torch 12: (a) if the nozzle 16 is not in electrical contact with either the electrode 14 or the workpiece 18, the voltage $V_1$ measured by the detection device 80 will be about 5 VDC; (b) if the nozzle 16 is in electrical contact with the electrode 14, the detection device 80 will detect a voltage $V_1$ of between about 1 and 2 VDC; and (c) if the nozzle 16 is in electrical contact with the workpiece 18, the detection device 80 will measure a voltage $V_1$ of about zero. Thus, by measuring the voltage $V_1$ at the line 54, the sensing circuit 64 can determine if continuity exists between the nozzle 16 and the electrode 14 and whether continuity exists between the nozzle 16 and the workpiece 18.

The controller 82 typically controls the system 10 to prevent operation if the continuity condition of the torch 12 indicates that the torch 12 is not properly assembled or is not operating correctly. For example, in a blow-back or blow-forward plasma torch, the electrode 14 and nozzle 16 should normally make contact when gas is not flowing through the nozzle 16, and the electrode 14 and nozzle 16 should not make contact when gas is flowing through the nozzle 16. However, if the electrode 14 is not installed, the sensing circuit 64 will determine that the nozzle 16 and electrode 14 are not in contact in the resting position, i.e., without the gas flowing, and the controller 82 can respond by preventing operation of the torch 12. If the nozzle 16 and the electrode 14 make electrical contact with one another when the gas is flowing through the nozzle 16, the electrode 14 or nozzle 16 may be stuck and failing to adjust properly in response to the flow of gas. Similarly, if the nozzle 16 and electrode 14 separate but become stuck in the separated configuration, the sensing circuit 64 will detect a lack of electrical continuity after the flow of gas has been terminated. The sensing circuit 64 and the controller 82 can be configured to detect at various times during or between operations of the torch 12 to detect improper or unexpected continuity conditions, though not typically while a pilot or main arc is established. For example, the sensing circuit can determine if the nozzle 16 or the electrode 14 is in contact with the workpiece 18 and prevent start-up of the torch 12 until the torch 12 is separated from the workpiece 18. If an improper configuration or operation of the torch 12 is detected, the controller 82 can prevent or modify the typical operation of the gas flow, the arc, the trigger switch 84, or the like.

The sensing circuit 64 can be configured to distinguish between the multiple voltages that are characteristic of the different continuity conditions of the torch 12. In particular, the detection device 64 can compare the voltage $V_1$ to one or more predetermined thresholds that define ranges of values characteristic of each possible torch condition. For example, the detection device 64 can be configured to detect whether the voltage $V_1$ is (a) greater than a first threshold, such as about 4.5 VDC, (b) less than a second threshold such as about 1 VDC, or (c) between multiple thresholds such as between about 1 and 2 VDC or, alternatively, between about 1 and 4.5 VDC. It is appreciated that the values of the various thresholds or ranges can be determined according to the expected voltages for various conditions of the torch 12, including variations to the voltages that can result due to varying resistance in the components of the system 10, wear or erosion of the components of the torch 12, temperature variations, and the like.

FIGS. 2 and 3 illustrate the operations of the system 10 according to one method of the present invention. It is appreciated that the illustrated method is exemplary in nature, and the system 10 can be operated in numerous other manners. That is, in other embodiments of the present invention, the system 10 can be operated according to a method that includes additional operations and/or omits one or more of the illustrated operations.

Upon initiation of the system 10, such as by an operator input or by an automated signal, the power supply 32 is turned on. See block 100. At block 102, the controller 82 determines if the trigger switch 84 is on. If so, the controller 82 indicates a fault (see block 104) and returns to block 102. Throughout operation, the controller 82 can indicate faults by powering a warning light or alarm on the output device 86, issuing a lockout signal that prevents certain operations of the system 10, and the like. For example, at block 104, the controller 82 can indicate to the operator that the trigger switch 84 is on and that the operator should release the trigger switch 84 and/or check the connection and operation of the trigger switch 84.

If the trigger switch 84 is not on at block 102, the system 10 proceeds to block 106, and the detection device 80 samples the signal from the cathode 72 of the diode 62 on the line 54. If the voltage $V_1$ (indicated as $V_D$ in FIGS. 2 and 3) is greater than a first threshold (see block 108), such as 4.5 VDC, characteristic of a lack of continuity between the nozzle 16 and the electrode 14, the controller can issue a fault (see block 110) indicating to the operator that the electrode 14 is not installed or is improperly separated from the nozzle 16. In addition to the electrode 14 being stuck in an operating position, this condition also could be indicative of the nozzle 16 and/or the electrode 14 being disassembled from the torch 12. Otherwise, if the voltage $V_1$ is not greater than the first threshold, the system 10 energizes the gas solenoid 24 in the metering system 22 so that a flow of gas is provided through the nozzle 16. See block 112. With the gas flowing, the voltage $V_1$ is again sampled and compared to the first threshold (see blocks 114 and 116). If the voltage $V_1$ is not greater than the first threshold, i.e., indicating that the nozzle 16 and electrode 14 are not electrically disconnected, the system 10 takes no action at block 118 and returns to block 114 to re-sample the signal from the diode 62 while the gas continues to flow through the nozzle 16. That is, if the flow of the gas does not separate the nozzle 16 and electrode 14, the system 10 does not proceed with operation of the torch 12.

On the other hand, if the detection device 80 determines that the voltage $V_1$ is greater than the first threshold, thereby indicating that the nozzle 16 and electrode 14 are properly disconnected by the flow of gas through the nozzle 16, the controller 82 can extinguish any fault lights or other fault indicators (see block 120) and de-energize the gas solenoid 24 so that the flow of the gas through the nozzle 16 is terminated (see block 122). After a one second delay (see block 124), the system 10 proceeds to the operations illustrated in FIG. 3, having verified the assembly and operation of the torch 12 components.

Referring now to FIG. 3, the controller 82 enables the trigger switch 84 (see block 126), and checks if the trigger switch 84 is on, i.e., whether the operator is depressing or otherwise actuating the switch 84 to operate the torch 12 (see block 128). If the trigger switch 84 is not on, the system 10 proceeds to block 130 and checks the voltage $V_1$. If the voltage $V_1$ is greater than the first threshold (see block 132), indicating that the electrode 14 is no longer in continuity with the nozzle 16, the system 10 disables the trigger switch 84 (see block 124), turns the gas solenoid 24 on for a brief interval (see block 136), then returns to block 130. Thus, if the electrode 14 remains out of contact with the nozzle 16, e.g., because the operator has removed the electrode 14, the system 10 will continue to cycle through blocks 130–136, and the pulsing of the gas flow can provide an indication to the operator that the torch 12 is not operating correctly due to the electrode 14 being out of place.

If the voltage $V_1$ is not greater than the first threshold at block 132, indicating that the electrode 14 and nozzle 16 are in electrical contact, the system 10 proceeds back to block 126, again enabling the trigger switch 84 (e.g., if the trigger switch 84 was previously disabled in block 134), then to block 128. In block 128, if the trigger switch 84 is determined to be on, the gas solenoid 24 is energized for an interval such as about 0.5 seconds (see block 138), and the voltage $V_1$ is again tested (see blocks 140 and 142) during that interval to determine if the electrode 14 and nozzle 16 have separated with the flow of gas through the nozzle 16. This step provides a puff of pre-flow gas after the operator has activated the trigger switch 84 but before the operating current is turned on in order to provide a warning to the operator that the operating current will be starting imminently. If the voltage $V_1$ is not greater than the first threshold at block 142, indicating that the electrode 14 and nozzle 16 have not been separated by the flow of gas, the gas solenoid 24 is kept energized, and operation of the inverter circuit 36 of the power supply 32 is prevented to prevent delivery of the pilot or main arc current from the power source 30 to the torch 12. See block 144.

The condition of the trigger switch 84 is again sampled at block 145. If the trigger switch 84 is on at block 145, the voltage $V_1$ is again detected at block 146. If the voltage $V_1$ is not greater than the first threshold at block 148, then the system 10 returns to block 144. For example, the voltage $V_1$ may be less than the first threshold if the nozzle 16 is in electrical continuity with the workpiece 18. Thus, if the nozzle 16 makes contact with the workpiece 18, the system 10 will prevent the torch 12 from starting, and can prevent damage that can otherwise occur to the nozzle 16 if start-up continues in that condition. If the trigger switch 84 is not on at block 145, indicating that the operator is not attempting to operate the torch 12, then the system 10 proceeds to the gas post-flow operations at block 166.

Otherwise, if the trigger switch 84 is on at block 145 and the voltage $V_1$ is greater than the first threshold at block 148, then the system 10 proceeds with the starting of the torch 12. The gas solenoid 24 is de-energized at block 150, and a short delay, such as about 150 ms occurs at block 152. The inverter circuit 36 of the power supply 32 is then turned on for a short duration such as about 5 ms (see block 154), and the output of the second current sensor 52 is detected. If, at the end of the 5 ms period of block 154, the current sensor 52 indicates that the current $C_2$ is not greater than a current threshold (see block 158), such as about 3.5 amps, the inverter circuit 36 is turned off. See block 162. The system 10 cycles through steps 152–162 until the current $C_2$ is determined to be greater than the threshold or a maximum number of cycles, such as 10 cycles, is reached. See block 160. The cycling of the system 10 through blocks 152–162 prevents a continuous open circuit voltage from being provided. That is, unless a threshold current indicative of conduction from the electrode 14 to the nozzle 16 is detected, the inverter circuit 36 is alternately turned on for a short interval (block 154) and off for an interval (see block 152). It is appreciated that short duration pulses of a current with substantial intervals therebetween present a reduced risk during operation. Further, the nozzle 16, which is typically the only exposed electrically conductive part of the torch 12, is connected to the workpiece 18 through the diode 62 and resistors 56, 58. Thus, the maximum voltage at the nozzle 16 is a function of the regulated pilot arc current and the value of the resistors 56, 58. For example, if the maximum pilot arc current is 15 amps, and the two parallel resistors 56, 58 have a combined resistance of 4 ohms, then the maximum voltage at the nozzle 16 is 60 VDC.

If the maximum number of cycles is reached without detection of the minimum threshold current at block 158, the inverter circuit 36 is turned off (see block 164) and the system 10 proceeds to a gas post-flow routine. In particular, the system 10 continues the flow of gas through the nozzle 16 for a predetermined period, such as for a few seconds. At block 166, if the trigger switch 84 is turned on during the predetermined period, the system 10 proceeds to block 150. Otherwise, if the predetermined period of block 166 ends without activation of the trigger switch 84, the system 10 returns to block 128.

Referring again to block 158, if the current is higher than the threshold current at the end of the 5 ms period of block 154, the inverter circuit 36 is kept on and the gas solenoid 24 is energized. The resulting flow of gas through the nozzle 16 causes the electrode 14 to retract (in a blowback torch), and a pilot arc is established between the electrode 14 and the nozzle 16. Thereafter, the system 10 continues to verify that the trigger switch 84 is still on. See block 170. As long as the trigger switch 84 is on, the system 10 keeps the inverter circuit 36 on, keeps the gas solenoid 24 energized, and can proceed with establishing or maintaining a main arc between the electrode 14 and the workpiece 18 for a cutting operation. See block 172. At such time that the system 10 detects that the trigger switch 84 is turned off, the inverter circuit 36 is turned off (see block 164) and the system 10 proceeds to the gas post-flow operations at block 166.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for determining an operational condition of a gas torch connected to a main power source configured to form an arc between an electrode of the torch and at least one of a nozzle of the torch and a workpiece, the system comprising:

a diode device electrically connecting the workpiece to the nozzle and configured to control the direction of current between the workpiece and the nozzle; and a sensing circuit electrically connected to the workpiece and the nozzle, the sensing circuit being configured to provide an electric potential across the diode device between the nozzle and the workpiece;

wherein the sensing circuit is configured to sense a voltage at the diode device and thereby determine the electrical continuity of the nozzle with at least one of the electrode and the workpiece.

2. A system according to claim 1, further comprising a first electrically resistive device disposed between the diode device and the nozzle.

3. A system according to claim 2, further comprising a second electrically resistive device disposed between the sensing circuit and the diode device, the second resistive device having an electrical resistance significantly greater than the resistance of the first resistive device.

4. A system according to claim 2 wherein the electrode is electrically connected to the workpiece via a rectified bridge, the rectified bridge having an electrical resistance greater than the resistance of the first resistive device.

5. A system according to claim 1 wherein the anode of the diode device is electrically connected to the workpiece such that the diode device is configured to prevent a flow of current therethrough between the nozzle and the workpiece when the nozzle is characterized by a higher electric charge than the workpiece.

6. A system according to claim 1, further comprising at least one current sensor configured to measure the electric current through the nozzle of the torch.

7. A system according to claim 1 wherein the diode device is configured to prevent an operating current of the torch from the main power source from flowing through the sensing circuit.

8. A system according to claim 1 wherein the diode device is configured to connect the workpiece and the nozzle during an operation of the torch in which the arc is formed between the electrode and the workpiece.

9. A method for determining an operational condition of a gas torch including a main power source configured to form an arc between an electrode of the torch and at least one of a nozzle of the torch and a workpiece, the method comprising:
providing an electric potential between the nozzle and the workpiece; and
sensing the voltage across a diode device electrically connecting the workpiece and the nozzle to thereby determine a condition of electrical continuity between the nozzle and at least one of the electrode and the workpiece.

10. A method according to claim 9 wherein said providing step comprises providing a first electrically resistive device between the diode device and the nozzle, and said sensing step comprises sensing the voltage between the diode device and the first electrically resistive device.

11. A method according to claim 10 wherein said sensing step comprises providing the electric potential via a second resistive device having an electrical resistance greater than the resistance of the first resistive device.

12. A method according to claim 10, further comprising measuring an electric current through the nozzle of the torch.

13. A method according to claim 9 wherein said sensing step comprises detecting a lack of continuity according to the voltage sensed between the nozzle and workpiece.

14. A method according to claim 9, further comprising:
providing a flow of gas through the nozzle after determining that the electrode and workpiece are disconnected from the nozzle;
repeating said sensing step while the gas is flowing through the nozzle to detect a lack of continuity between the electrode and the nozzle; and
enabling a trigger switch of the torch for controlling a cutting operation upon detecting a lack of continuity between the electrode and nozzle while the gas is flowing through the nozzle.

15. A method according to claim 9, further comprising:
terminating a flow of gas through the nozzle;
repeating said sensing step after the flow of gas through the nozzle is terminated to detect a lack of continuity between the electrode and the nozzle; and
interrupting an operation of the torch upon sensing the lack of continuity between the electrode and the nozzle.

16. A method according to claim 9, further comprising:
enabling a trigger switch of the torch for controlling a cutting operation;
after said enabling step, repeating said sensing step and thereby detecting a lack of continuity between the electrode and nozzle; and
interrupting operation of the trigger switch upon detecting the lack of continuity between the electrode and the nozzle.

17. A method according to claim 9, further comprising:
enabling a trigger switch of the torch for controlling a cutting operation of the torch;
detecting an adjustment of the trigger switch for controlling the cutting operation;
upon detecting the adjustment of the trigger switch, providing a flow of gas through the nozzle of the torch;
thereafter, repeating said sensing step and thereby detecting a continuity between the nozzle and the workpiece; and
preventing initiation of an arc in the torch until a lack of continuity is detected between the nozzle and the workpiece.

18. A method according to claim 9 wherein said sensing step comprises comparing the voltage to at least two predetermined values defining first, second, and third predetermined voltage ranges, the first range being indicative of a lack of continuity between the nozzle and each of the electrode and workpiece, the second range being indicative of an electric continuity between the nozzle and the electrode, and the third range being indicative of an electric continuity between the nozzle and the workpiece.

19. A method according to claim 9 further comprising connecting the workpiece and the nozzle with the diode device during an operation of the torch in which the arc is formed between the electrode and the workpiece.

20. A method for determining an operational condition of a gas torch including a main power source configured to form an arc between an electrode of the torch and at least one of a nozzle of the torch and a workpiece, the method comprising:
providing an electric potential between the nozzle and the workpiece;
providing a flow of gas through the nozzle;
sensing the voltage across a diode device electrically connecting the workpiece and the nozzle to detect a lack of electrical continuity between the nozzle and the electrode while the gas is flowing through the nozzle;
terminating the flow of gas through the nozzle; and
sensing the voltage across the diode device to detect electrical continuity between the nozzle and the electrode after the flow of gas through the nozzle has been terminated.

21. A method according to claim 20, further comprising:
enabling a trigger switch of the torch for controlling a cutting operation; and
after said enabling step, sensing the voltage across the diode device and thereby detecting a lack of continuity between the electrode and nozzle.

22. A method according to claim 20, further comprising sensing the voltage across the diode device to detect electrical continuity between the nozzle and the workpiece.

23. A method according to claim 20 wherein at least one of said sensing steps comprises comparing the voltage to at least two predetermined values defining first, second, and third predetermined voltage ranges.

24. A system for controlling the flow of gas through a gas torch connected to a main power source configured to provide an operating voltage for forming an arc between an electrode of the torch and at least one of a nozzle of the torch and a workpiece, the system comprising:
a sensing circuit electrically connected to the workpiece and the nozzle, the sensing circuit being configured to provide an electric potential between the nozzle and the workpiece, the electric potential being of lesser voltage than the operating voltage of the main power source, and the sensing circuit being configured to detect a condition of continuity between the nozzle and at least one of the electrode and the workpiece; and a metering system configured to control a flow of gas through the nozzle of the torch according to the condition of continuity detected by the sensing circuit.

25. A system according to claim 24, further comprising a diode device electrically connecting the nozzle and the workpiece.

26. A system according to claim 25 wherein the diode device is configured to connect the workpiece and the nozzle during an operation of the torch in which the arc is formed between the electrode and the workpiece.

27. A system according to claim 24 wherein the sensing circuit is configured to detect a lack of continuity according to the voltage sensed between the nozzle and workpiece.

28. A system according to claim 27 wherein the metering system is configured to provide the flow of gas through the nozzle upon detection by the sensing circuit of the lack of continuity between the nozzle and each of the electrode and workpiece.

29. A system according to claim 24, further comprising a trigger switch for controlling a cutting operation of the torch, the trigger switch being selectively enabled and disabled according to the condition of continuity detected by the sensing circuit.

30. A system according to claim 24 wherein the main power source is configured to be controlled according to the condition of continuity detected by the sensing circuit.

31. A method for controlling the flow of gas through a gas torch connected to a main power source configured to provide an operating voltage for forming an arc between an electrode of the torch and at least one of a nozzle of the torch and a workpiece, the method comprising:
  providing an electric potential between the nozzle and the workpiece, the electric potential being of lesser voltage than the operating voltage of the main power source;
  sensing the voltage between the workpiece and the nozzle to thereby determine a condition of electrical continuity between the nozzle and at least one of the electrode and the workpiece; and
  controlling a flow of gas through the nozzle of the torch according to the condition of continuity detected by the sensing circuit.

32. A method according to claim 31 wherein said providing step comprises providing a diode device between the nozzle and the workpiece.

33. A method according to claim 32 further comprising connecting the workpiece and the nozzle with the diode device during an operation of the torch in which the arc is formed between the electrode and the workpiece.

34. A method according to claim 31 wherein said sensing step comprises detecting a lack of continuity according to the voltage sensed between the nozzle and workpiece.

35. A method according to claim 31, further comprising:
  providing a flow of gas through the nozzle after determining that the electrode and workpiece are disconnected from the nozzle;
  repeating said sensing step while the gas is flowing through the nozzle to detect a lack of continuity between the electrode and the nozzle; and
  enabling a trigger switch of the torch for controlling a cutting operation upon detecting a lack of continuity between the electrode and nozzle while the gas is flowing through the nozzle.

36. A method according to claim 31, further comprising:
  terminating a flow of gas through the nozzle;
  repeating said sensing step after the flow of gas through the nozzle is terminated to detect a lack of continuity between the electrode and the nozzle; and
  interrupting an operation of the torch upon sensing the lack of continuity between the electrode and the nozzle.

37. A method according to claim 31, further comprising:
  enabling a trigger switch of the torch for controlling a cutting operation;
  after said enabling step, repeating said sensing step and thereby detecting a lack of continuity between the electrode and nozzle; and
  interrupting operation of the trigger switch upon detecting the lack of continuity between the electrode and the nozzle.

38. A method according to claim 31, further comprising:
  enabling a trigger switch of the torch for controlling a cutting operation of the torch;
  detecting an adjustment of the trigger switch for controlling the cutting operation;
  upon detecting the adjustment of the trigger switch, providing a flow of gas through the nozzle of the torch;
  thereafter, repeating said sensing step and thereby detecting a continuity between the nozzle and the workpiece; and
  preventing initiation of an arc in the torch until a lack of continuity is detected between the nozzle and the workpiece.

39. A method according to claim 31 wherein said sensing step comprises comparing the voltage to at least two predetermined values defining first, second, and third predetermined voltage ranges, the first range being indicative of a lack of continuity between the nozzle and each of the electrode and workpiece, the second range being indicative of an electric continuity between the nozzle and the electrode, and the third range being indicative of an electric continuity between the nozzle and the workpiece.

* * * * *